United States Patent [19]
Betterton et al.

[11] Patent Number: 4,886,033
[45] Date of Patent: Dec. 12, 1989

[54] STABILIZED FLOW CONTROL VALVE

[75] Inventors: Joseph T. Betterton, Arab; Alfred H. Glover, Decatur; Thomas S. McKee; Chris S. Romanczuk, both of Madison, all of Ala.

[73] Assignee: Chrysler Motors Corporation, Highland Park, Mich.

[21] Appl. No.: 237,814

[22] Filed: Aug. 29, 1988

[51] Int. Cl.[4] ........................................... F02M 25/06
[52] U.S. Cl. .................................. 123/574; 137/593.15
[58] Field of Search ............... 123/572, 574; 137/536, 137/543.15, 540

[56] References Cited

U.S. PATENT DOCUMENTS

| | | | |
|---|---|---|---|
| 1,216,144 | 2/1917 | Lepley | 137/543.15 |
| 1,327,564 | 1/1920 | McDougall | 137/543.15 |
| 2,809,660 | 10/1957 | Becker | 137/543.15 |
| 3,356,103 | 12/1967 | Biello et al. | 137/536 |
| 3,460,805 | 8/1969 | Kudlaty | 137/543.15 |
| 3,594,020 | 7/1971 | Ehlert | 123/574 |
| 3,661,128 | 3/1972 | Eshelman | 123/574 |
| 3,662,724 | 3/1972 | Ohar et al. | 123/574 |
| 4,456,029 | 6/1984 | McCrum | 137/543.15 |

Primary Examiner—Willis R. Wolfe
Assistant Examiner—M. Macy
Attorney, Agent, or Firm—Kenneth H. MacLean, Jr.

[57] ABSTRACT

A gas flow control valve for engine crankcase emissions includes an enclosure and a hollow valve element which is supported on a rod to permit sliding movements in response to a balance of forces produced by gas pressure and a closing spring located within the hollow control valve element. Vanes straighten gas flow to prevent oscillation and rotation of the valve element.

2 Claims, 1 Drawing Sheet

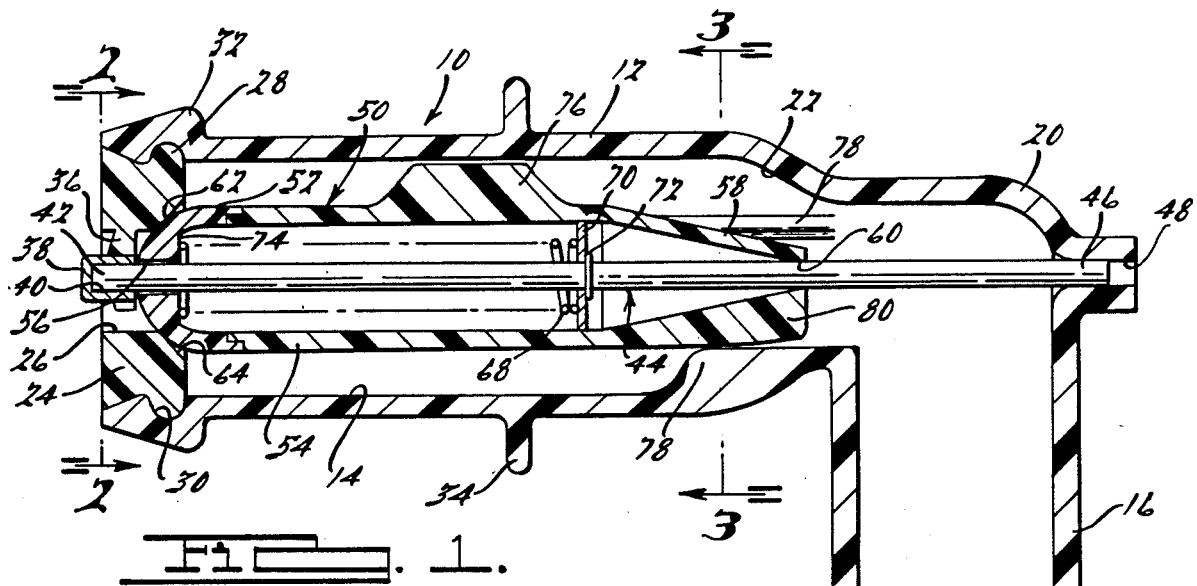

STABILIZED FLOW CONTROL VALVE

BACKGROUND OF THE INVENTION

Crankcase emission control or PCV valves have previously been used in association with internal combustion engines. These valves usually utilize a valve element movable against the force of a spring to regulate gas and air flow.

A problem with prior valves is relatively large resistance to flow and a tendency for the valve element to oscillate or vibrate particularly at high flow rates. It has been found that prevention of spiral flow through the valve tends to greatly reduce vibration and oscillation.

Still another problem with prior valves is a lack of a shut-off feature when the engine is inoperative. A shut off would isolate the crankcase from external conditions which is desirable.

By way of example, the U.S. Pat. No. 3,662,724 to Ohar discloses a prior crankcase control valve of the same general type as the subject valve. A movable valve element and spring are in the gas flow passage which is undesirable. Likewise, U.S. Pat. No. 3,661,128 displaces the same undesirable feature.

SUMMARY OF THE INVENTION

The subject crankcase emission control valve promotes stability of the valve element within the flow passage. It includes a vaned inlet, vaned valve element and vaned flow passage. Also, the valve element is hollow and contains the closing spring. This prevents interference of the spring with gas flow so that turbulence is not produced thereby.

The subject valve has an upstream facing rounded end which is cooperative with an annular seat formed in an apertured inlet member. When the engine is deactivated, the end of the valve seats to cut off flow and to isolate the crankcase from the outside environment.

Further advantageous features of the subject control will be more readily apparent from an examination of the accompanying drawing of a preferred embodiment and a reading of the following detailed description of the preferred embodiment.

IN THE DRAWINGS

FIG. 1 is an sectioned side view of the emission control valve; and

FIG. 2 is a end view of the emission control valve taken long line 2—2 in FIG. 1 and looking in the direction of the arrows; and FIG. 3 is a sectioned view of the emission control valve taken along section line 3—3 in FIG. 1 and looking in the direction of the arrows.

DETAILED DESCRIPTION OF AN EMBODIMENT

FIG. 1 illustrates an improved emission control valve used to control ventilation of a engine's crankcase. The control valve includes a hollow and generally L-shaped housing 10 having a leftward upstream end portion 12 which defines an interior passage 14. The housing 10 also has a downstream end portion 16 which defines an interior passage 18. Passages 14 and 18 are interconnected by intermediate elbow portion 20. In a preferred embodiment, portions 12, 16 and 20 are integrally mold formed of elastomeric material. A converging orifice passage 22 is formed between the end 12 and the elbow portion 20.

An inlet forming end member 24 is attached to the leftward end portion of housing 12 as shown in FIG. 1. The end member 24 has a central opening 26 to accept the flow of gases from the crankcase of an associated engine (not shown). Member 24 has a rounded annular rim 28 thereon adapted to fit within an annular groove 30 formed in member 12 to secure the member 24 to housing 12. This also permits assembly by simply snapping rim 28 into the groove 30. The inlet opening 26 receives gasses from the engine crankcase. For this purpose, the portion 12 of housing 10 projects through an aperture in an engine valve cover (not shown). The valve cover is typically located at the upper portion of an engine. For this purpose, housing 10 is inserted into an apertured rubber grommet (not shown) which is supported in the valve cover. A radially outwardly extending lip 32 is formed inward from the leftward end of the housing to secure the housing in the grommet. Also, a radially extending portion 34 is provided near the mid-portion of the upstream arm 12 for axially locating the housing in the grommet.

As previously mentioned, crankcase gasses flow through the inlet 26. As best shown in FIG. 2, passage 26 has three radially directed vanes 36 which extend from the outer portion of member 24 and are integrally joined at the center to a cylindrical boss portion 38. Referring back to FIG. 1, the boss portion 38 defines an interior bore 40 in which a leftward end 42 of a elongated shaft 44 extends. Shaft 44 then extends coaxially through the passage 14 of portion 12 of housing 10 and then through the orifice portion 22. The rightward end 46 of shaft 44 is supported within an aperture 48 formed in the elbow portion 20 of the housing 10.

The passage 14 encloses a generally cylindrically shaped and elongated valve member 50 as shown in FIG. 1. Valve member 50 is mounted on shaft 44 and allowed to move axially thereon. The leftward end of the valve member 50 has a rounded end cap portion 52. The cap 52 attaches to a hollow main body 54 of valve 50. End cap 52 has a central aperture 56 which encircles the shaft 44. The tubular body 54 has a leftward end portion 58 which has an aperture 60 which surrounds the shaft 44. By this means of support, valve 50 may slide in an axial direction from the leftward position shown in FIG. 1.

The above described valve position as in FIG. 1 represents a closed or zero flow operative position. This is the position the valve assumes when the associated engine is inoperative. Desirably, the end surface 62 of the cap 52 engages seat surface 64 formed on the end member 24. This blocks gas flow through the valve when the control valve 50 is to the left as in FIG. 1. The gasses are only permitted to flow through the inlet passage 26 to the passage 14 when the valve 50 and end cap 52 move to the right.

The flow of gasses through housing 10 passes about the rightward end portion 58 which has a decreasing tapered configuration as shown in FIG. 1. Movement of the valve 50 and the tapered end 58 to the right progressively decreases the annular gas flow space formed between tapered end portion 58 and orifice portion 22. It should be noted that the downstream end portion 16 of housing 10 is adapted to be attached to a hose or the like (not shown) to pass gasses from housing 10 to the air intake portion of the associated engine. For this purpose, an enlarged rib portion 66 is formed to create a good seal with the inner portion of the aforementioned hose.

The previously described sliding movement of valve 50 along shaft 44 occurs in response to forces created by gas pressure of the crankcase higher than the pressure at end portion 16 of housing 10. When the pressure differential is close to zero, it is desirable that the control valve 50 assume the closed position shown in FIG. 1. This closes the inlet 26 and seals the crankcase of the inoperative engine while also preventing reverse flow back into the crankcase. A spring 68 is positioned within the interior of the hollow control valve 50. It moves the valve 50 toward the closed position. Specifically, spring 58 is a relatively light compression type coil spring. Its rightward end is secured relative to the shaft 44 by means of a stop washer 70. The stop washer 70 is prevented from rightward movement on shaft 44 by an annular projection 72 found on the shaft. The leftward end of the spring engages an end surface 74 of the end cap 52.

With emission control valves for crankcase ventilation of this type, the flow rate through the valve may be quite significant under certain engine operating conditions. The aforementioned placement of the spring 68 within the hollow interior of the control valve 50 greatly enhances gas flow through housing 10 by shielding the spring from the flow and preventing turbulence. It is known that these large flow rates may produce undesirable vibration or oscillations of the valve and resultant fluctuations in the gas flow. To straighten flow, the subject control includes three outwardly projecting vanes 76 which are molded with the cylindrical body 54 of valve 50. These vanes are shown in FIGS. 1 and 3 and tend to stabilize the control valve 50. Relatingly, the gas flow through housing 10 tends to proceed in a substantially straight axial direction and swirling is reduced. As previously mentioned, the inlet passage 26 also includes three vanes 36. These vanes 36 tend to straighten any flow entering the passage 14. Likewise the vanes 76 on the body of valve 50 tend to maintain this straight flow of gas. To further promote the axial flow of gas, three additional vanes 78 are mold formed with the housing 10 and extend into passage 14 and orifice 22 as shown in FIG. 1 and 3.

Any rotation of the valve 50 around the shaft 44 is also undesirable. To prevent rotation, a single tail vane 80 is formed adjacent the rightward end of the valve 50 as best shown in FIG. 1 and 3. Vane 80 and a closely adjacent aligned vane 78 prevent rotation of the control valve 50.

Although only a single embodiment of the invention has been illustrated and described in detail heretofore, it should be pointed out that modifications may be made which do not fall outside the scope of the following claims which define the invention.

We claim:

1. With an internal combustion engine, a crankcase gas flow control device located between the engine crankcase and the engine fuel-air induction, comprising:

a hollow housing with inlet and outlet and portions forming a passage for gas flow therebetween, a converging orifice passage in the flow direction between the inlet and outlet end portions;

an apertured member forming an inlet which is supported in the end of the inlet end portion of the housing and defining an inlet therethrough for gas passage;

a plurality of radially directed vanes in the inlet aperture to straighten gas flow entering the housing;

a rod extending through the housing coaxially with the inlet and the orifice passage;

a substantially hollow valve element slidably mounted about and axially movable along the rod;

a downstream end portion of the hollow valve element being progressively tapered and adapted for movement into the converging orifice as a pressure differential between the inlet and outlet end portions of the housing increases thereby controlling gas flow through the housing;

the hollow valve element having a plurality of vanes spaced about its circumference and extending axially therealong and radially outward whereby the gas flow along the exterior surface of the valve tends to follow a straight axial path which stabilizes the valve and inhibits undesired oscillation thereof;

the housing interior and the converging orifice housing portion has a plurality of circumferentially spaced vanes located downstream from the inlet.

2. With an internal combustion engine, a crankcase gas flow control device located between the engine crankcase and the engine fuel-air induction, comprising:

a hollow housing with inlet and outlet end portions forming a passage for gas flow therebetween, a converging orifice passage in the flow direction between the inlet and outlet end portions;

an apertured member forming an inlet which is supported in the end of the inlet end portions of the housing and defining an inlet therethrough for gas passage;

a plurality of radially directed vanes in the inlet aperture to straighten gas flow entering the housing;

a rod extending through the housing coaxially with the inlet and the orifice passage;

a substantially hollow valve element slidably mounted about and axially movable along the rod;

a downstream end portion of the hollow valve element being progressively tapered and adapted for movement into the converging orifice as a pressure differential between the inlet and outlet end portions of the housing increases thereby controlling gas flow through the housing;

the hollow valve element having a plurality of vanes spaced about its circumference and extending axially therealong and radially outward whereby the gas flow along the exterior surface of the valve tends to follow a straight axial path which stabilizes the valve and inhibits undesired oscillation thereof;

the housing interior and the converging orifice housing portion has a plurality of circumferentially spaced vanes located downstream from the inlet;

the tapered end portion of the hollow valve element has a single vane whereby cooperation between a vane projecting from the housing tends to inhibit rotation of the valve element.

* * * * *